July 18, 1933.  F. KRÖHL  1,918,649

BEVEL DRIVE FOR THE STEERING WHEELS OF MOTOR VEHICLES

Filed March 16, 1931

Inventor:
F. Kröhl
By Marks & Clerk
Attys.

Patented July 18, 1933

1,918,649

UNITED STATES PATENT OFFICE

FRITZ KRÖHL, OF REINICKENDORF-OST NEAR BERLIN, GERMANY

BEVEL DRIVE FOR THE STEERING WHEELS OF MOTOR VEHICLES

Application filed March 16, 1931, Serial No. 523,114, and in Germany December 13, 1929.

The present invention relates to a bevel drive for the steering wheels of motor vehicles, for which I have filed an application in Germany on December 13, 1929, and more particularly for a dust-proof and oil-tight casing for the bevel drive.

In those drives in which the driving bevel wheel is located above or below the centre of the axle, or in which use is made of a hollow axle, a fixed and readily removable casing consisting of two halves has been employed as a protection against the penetration of dirt or dust, the said casing enclosing all the bevel wheels. In these devices the slot through which the steering swivel extends is sealed in every position of the steering swivel, partly internally and partly externally by a screen sliding on the casing.

In order to enable the steering of the steering swivel projecting out of the slot in the casing to be effected, the steering swivel is oscillatable about a steering swivel journal and controlled by a steering lever, oscillating around the steering swivel journal The special construction of such a dust-proof device according to this invention attains a better sealing between the stationary casing and the movable screen than has hitherto been provided. For this purpose the stationary casing is so constructed that the screens that close the aperture through which the steering swivel and the wheel hub come out are moved inside a cavity formed by the casing, and, if desired, by separate guiding cups mounted thereon, in a direction corresponding to the direction of deflection of the steering swivel.

A further object of the invention is to obviate wear of the screens, which is particularly great at the point of passage of the steering swivel and wheel hub, owing to the pressure thereof in the direction of steering. For this purpose the screens are controlled, according to the invention, by guiding bolts, which are connected with the steering swivel, so that the screens do not have to take up any lateral pressure. In this way a disadvantage is eliminated which is experienced to quite a special extent in the known sealing devices, in which the screens are at the same time constructed as steering swivels, and in which steering is effected owing to the pressure or pull of the screen upon the wheel hub.

A further novel feature of the invention is the sealing of the aperture through which the wheel hub extends by means of the closure screens of the casing. According to the present invention the wheel hub is constructed with a cup-shaped rim or flange, which projects into a small groove in the closure screens and prevents the penetration of dirt and oil. Instead of this the groove might of course be provided in the wheel hub, and the rim might be secured to the screens.

In order to enable ordinary undivided front wheel brakes to be used with such a construction of the casing, according to the invention the wheel flange is made detachable from the wheel hub. For instance a hollow hub member carrying the wheel flange is mounted upon the part of the hub that carries the driving member. The two parts are coupled with one another by means of tappets and secured against longitudinal displacement in relation to one another.

The constructional parts that form the invention have important advantages as compared with the known constructions of this type owing to their special character, the protection against contamination of the bevel drives being increased and the manufacture being simplified. Furthermore owing to the reduction in the stresses of the screens by compression or tension a longer life is ensured.

The invention is illustrated in one constructional example in which the driving bevel wheel is located above the axle in the accompanying drawing in which, Figure 1 shows the opened casing, with the steering-wheel drive enclosed by it, the bevel wheels constituting the driving means, the casing, the detachable wheel flange, the wheel cap that secures the wheel flange, and the brake being shown in section, while the remaining parts of the steering-wheel drive are shown in outside elevation.

Figure 1:
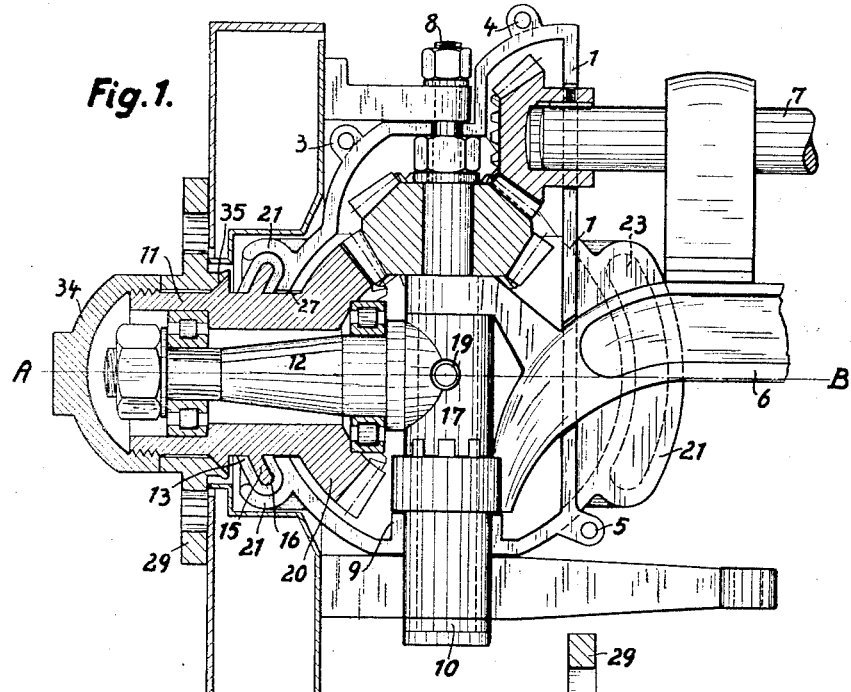
Figure 3:
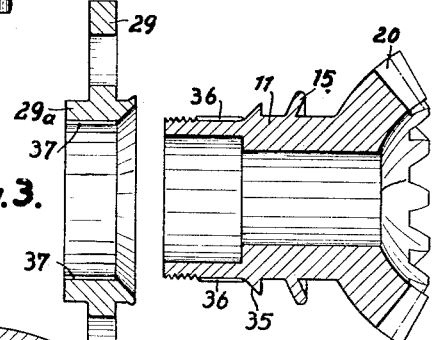
Figure 3 shows the detachable wheel flange in section.
Figures 2, 4:
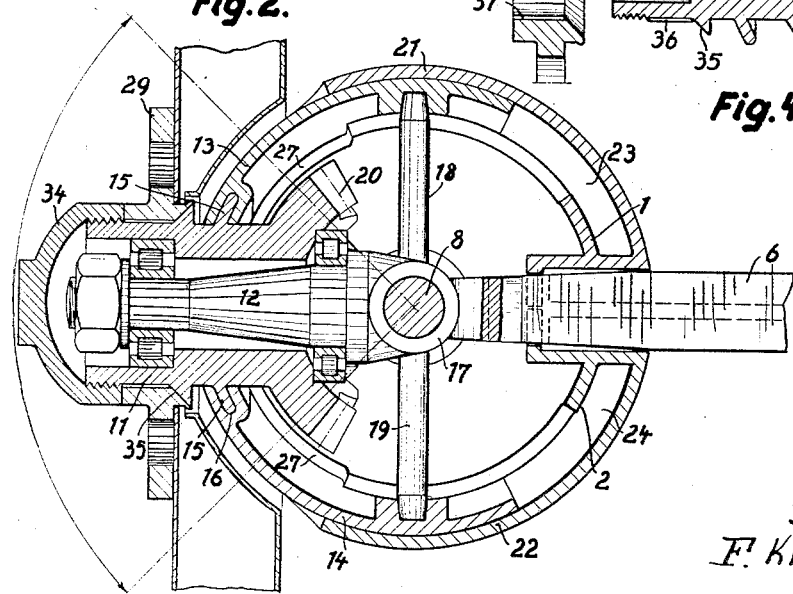
Figure 2 shows a plan of the device in section on the line A—B in Figure 1.
Figure 4 shows the wheel hub, with the driving bevel wheel, in section.

The casing consists of two readily detachable cups 1 and 2, which are divided in a vertical plane, together with two guiding cups 21 and 22, which form the cavities 23 and 24, in which the closure screens 13 and 14 are inserted. The two casing cups 1 and 2 are bolted together at three points 3, 4 and 5. For the passage of the car axle 6, the driving shaft 7 and the axle fork bolt 8, apertures are provided, which, together with the shank-like flanging 9 for the sleeve of the steering lever 10, hold the casing fast in its position.

In order to enable the wheel hub 11, with the steering swivel 12 inside it, to be rocked round the axle fork bolt 8, the casing has a window-like aperture 27, which is sealed by a screen, which is rotatable about the same bolt 8, and which consists of two halves 13 and 14, which slide in the cavities 23 and 24. Upon the wheel hub 11 is mounted a sealing rim or flange 15, which runs in a sealing guide or groove 16 provided in the closure screens 13 and 14. By providing the casing with cavities wherein the screens slide a reliable protection against the penetration of dust is secured. The closure screens 13 and 14 are controlled by the two pins 18 and 19 connected with the sleeve 17 of the steering swivel 12, in the same direction and to the same extent as the steering swivel 12, so that in all points a careful sealing is provided, and a lateral grinding of the aperture in the closure screens 13 and 14 by the wheel hub 11 is prevented.

The bottom aperture of the casing 1 and 2, which serves for the passage of the steering-swivel journal 8 is widened in such a way that the flanging 9 of the casing halves 1 and 2 encloses the sleeve of the steering swivel 10 and the steering swivel journal 8, and in a known manner forms an oil trough, from which the revolving bevel wheel 20 of the steering swivel 12 conveys lubricant continuously to all the pressure and bearing points.

In order to enable an ordinary undivided brake to be used when employing the method of sealing the casing described above, the flange 29, to which the wheel is secured, is removably mounted upon the wheel hub 11. For this purpose the flange 29 is provided with a hollow hub part 29a, which is equipped internally with longitudinal grooves 37. The hub 11 carries corresponding longitudinal ribs 36. These interengaging longitudinal ribs and grooves prevent the flange 29 from rotating relatively to the hub 11 after it has been slipped on to the latter. The hub 11 is equipped with an inclined contact surface 35 for the hub part 29, against which the hub part 29a is pressed by means of a screw cap 34.

Internally there is secured to the wheel flange 29 the brake drum, the securing of the brake drum to the wheel flange being of course effected before the latter is slipped on.

In the brake drum are arranged the usual brake shoes, which for the sake of a simplicity have not been illustrated, with the associated applying members.

The detachability of the wheel flange serves in the present instance merely for the attachment of the brakes and not for the mounting of the wheels.

What I claim is:

1. A bevel drive for the steering wheels of motor vehicles, comprising a wheel hub for the steering wheel, a steering swivel journal, a steering swivel oscillatable about the axis of the steering swivel journal, a divided casing, formed with an aperture through which the steering swivel and the wheel hub of the steering wheel extend out of the casing, said casing having cavities in its walls, at least one screen adapted to seal the said aperture, and guiding pins connecting the screen and the steering swivel to positively move the screen in the cavities and in a direction corresponding to that in which the steering swivel is deflected.

2. A bevel drive for the steering wheels of motor vehicles, comprising a wheel hub for the steering wheel, a steering swivel, a pair of separable guiding cups providing a casing having an aperture through which the steering swivel and the wheel hub of the steering wheel extend from the casing, cups within the casing forming in conjunction with the guiding cups cavities, screens for sealing the aperture, and means connecting the steering swivel and screens for moving the screens in the cavities in a direction corresponding to that in which the swivel is moved.

FRITZ KRÖHL.